E. L. DROZ.
FENDER.
APPLICATION FILED DEC. 13, 1913.
1,107,046.
Patented Aug. 11, 1914.
2 SHEETS—SHEET 2.
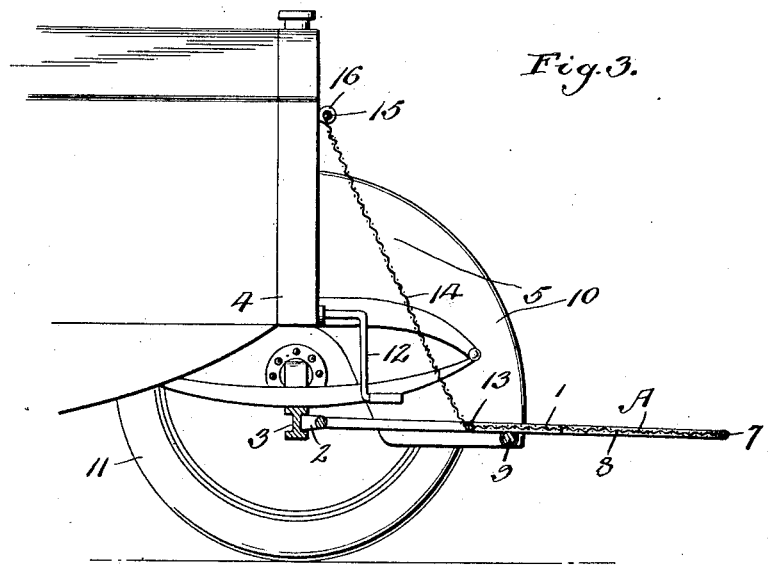
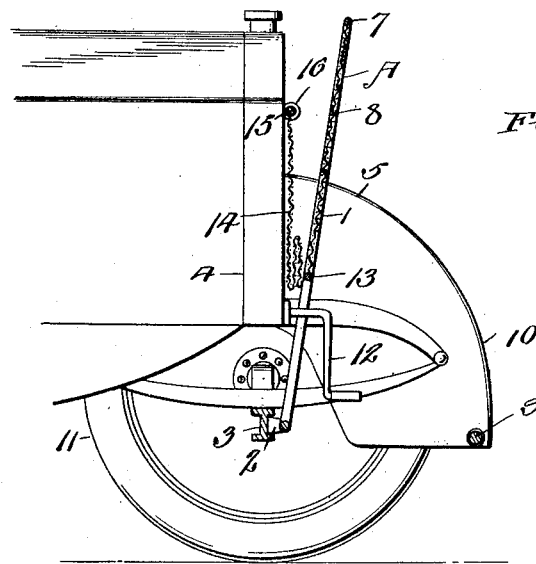
Witnesses
Inventor
E. L. Droz,
By Victor J. Evans
Attorney

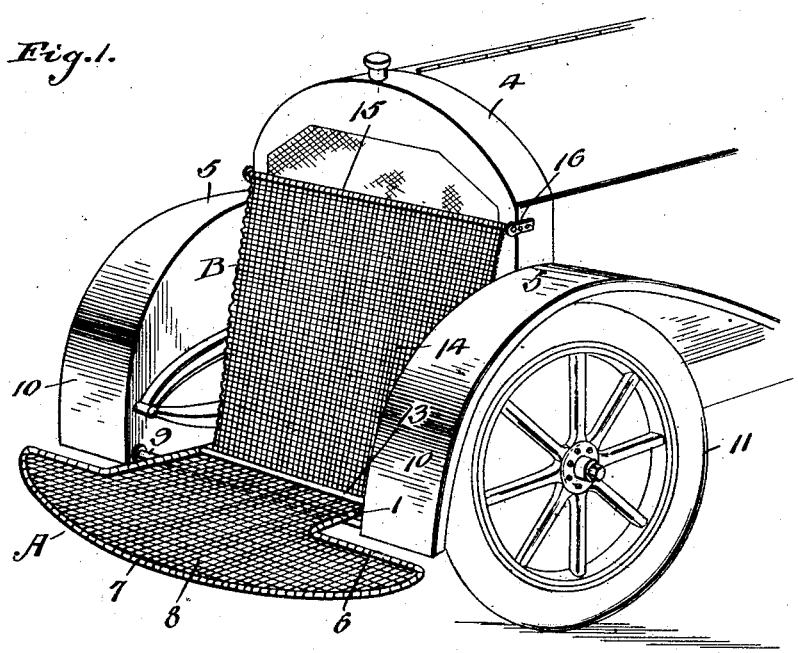
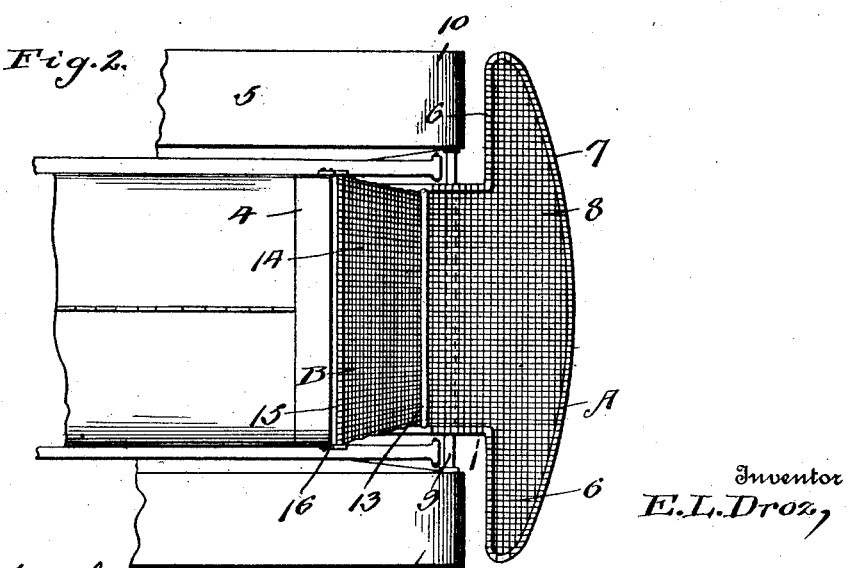

UNITED STATES PATENT OFFICE.

EARL LOUIS DROZ, OF COLVILLE, WASHINGTON.

FENDER.

1,107,046.  Specification of Letters Patent.  Patented Aug. 11, 1914.

Application filed December 13, 1913. Serial No. 806,620.

*To all whom it may concern:*

Be it known that I, EARL LOUIS DROZ, a citizen of the United States, residing at Colville, in the county of Stevens and State of Washington, have invented new and useful Improvements in Fenders, of which the following is a specification.

This invention relates to fenders for automobiles, motor trucks and similar motor propelled vehicles, the object of the invention being to provide a folding fender which when not in use will occupy a position in front of the radiator without interfering with the free draft of air through the radiator and which when lowered to its operative position will pick up persons and objects without injury and also render it next to impossible for persons to get caught beneath the front wheels of the machine.

A further object of the invention is to produce a fender which will fold in such manner as not to interfere with the hand cranking of the machine and which, furthermore, will not detract from, but rather add to, the appearance of the machine.

With the above and other objects in view, the invention consists in the construction, combination and arrangement of parts, as will hereinafter be more fully described, illustrated and claimed.

In the accompanying drawings:—Figure 1 is a perspective view of the front portion of an automobile showing the improved fender mounted thereon. Fig. 2 is a plan view of the same. Fig. 3 is a vertical longitudinal section, showing the fender lowered or in its operative position. Fig. 4 is a similar view showing the fender nearly folded.

The fender contemplated in this invention embodies a main fender body or section, indicated generally by the reference character A, and an auxiliary section B in the form of a flexible apron. The main body section A embodies a stout marginal frame comprising the substantially parallel side bars 1, which at their rear ends are pivotally mounted or journaled on brackets 2 secured in fixed relation to the front axle 3 or other fixed part of the machine, whereby the main section of the fender may be folded to occupy a substantially vertical position in front of the radiator, indicated at 4, or lowered to occupy a substantially horizontal position, as shown in Figs. 1, 2 and 3. The frame bars 1 are extended laterally in opposite directions, as shown at 6, so as to project in front of the front mud guards 5, as clearly shown in Figs. 1 and 2, and the outer extremities of the lateral extensions 6 are connected by an arcuate front bar 7. If desired, all of the bars, 1, 6 and 7 may be formed in one piece, as illustrated, and the whole main section thus formed is covered with netting or meshed fabric, as indicated at 8.

When the main section A of the fender is in its operative or lowered position, it is upheld in such position by means of a supporting bar 9 in the form of a tie rod, which is fixedly connected at its opposite ends to the mud guard extensions 10, the mud guards 5, for the purpose of this invention, being extended downward in front of the steering wheels 11 to a point about on a level with the axle 3 of the machine, as indicated in Figs. 3 and 4.

The side bars 1 are connected at a suitable point in advance of the axle 3 and starting crank 12 by a cross bar 13, to which the rear edge of the netting 8 is attached. Attached to this same bar 13 is the bottom edge of a flexible apron 14, also of meshed fabric or netting, the top edge of the apron 14 being secured to a cross rod 15 shown as connected at its opposite ends to clips or fasteners 16 secured to opposite sides of the radiator 4. By reference to Fig. 3 it will be observed that when the fender is in its operative position, the flexible apron is located in advance of the starting crank 12, so that a person picked up in the fender will not come in contact with said starting crank. Furthermore, when the fender is folded, as shown in Fig. 4, said fender will not interfere with the cranking of the machine by means of the hand crank 12. In order to crank the machine, the operator merely has to lift the fender, by taking hold of the arcuate front bar 7, and having folded the fender up against the radiator, he may freely turn the crank 12 to start the engine. He afterward drops the fender to the operative position illustrated in Fig. 1, where it rests upon the supporting tie rod 9.

The fender extensions 10 cover in the steering wheels of the machine and prevent a person from being run down thereby while the fender itself picks up the person and prevents such person or any other object from passing under the machine. It will further be observed that by reason of the particular shape imparted to the main section A of the fender, the latter extends across both mud guards and steering wheels and therefore a person must either be picked up by the fender or else brushed to one side or the other.

What I claim is:—

1. In an automobile fender, the combination with the front mud guards of the machine, of a fender supporting tie rod connecting the forward extremities of said mud guards and supported thereby, and a fender embodying a main section pivotally mounted with respect to the machine frame and adapted to rest on said supporting rod and fold backwardly toward the radiator, and a flexible fender apron attached along its bottom edge to said main section and supported along its top edge in fixed relation to the machine frame.

2. In an automobile fender, the combination with the front mud guards of the machine, of a fender supporting tie rod connecting the forward extremities of said mud guards and supported thereby, and a fender embodying a main section pivotally mounted with respect to the machine frame and adapted to rest on said supporting rod and fold backwardly toward the radiator, and a flexible fender apron attached along its bottom edge to said main section and supported along its top edge in fixed relation to the machine frame, the forward portion of the main fender section being laterally expanded to extend in front of the mud guards when lowered and across said mud guards when folded.

3. In an automobile fender, the combination with the front mud guards of the machine, of a fender supporting tie rod connecting the forward extremities of said mud guards and supported thereby, and a fender embodying a main section pivotally mounted with respect to the machine frame and adapted to rest on said supporting rod and fold backwardly toward the radiator, a cross bar forming part of said main section and located so as to sweep clear of the starting crank as said main section is raised and lowered, and a flexible fender apron having its bottom edge attached to said cross bar and its top edge supported in fixed relation to the machine frame.

In testimony whereof I affix my signature in presence of two witnesses.

EARL LOUIS DROZ.

Witnesses:
JOHN E. MILLER,
CARL A. BUCHANAN.

---

Copies of this patent may be obtained for five cents each, by addressing the "Commissioner of Patents, Washington, D. C."